(12) United States Patent
Varnum et al.

(10) Patent No.: US 12,031,346 B2
(45) Date of Patent: Jul. 9, 2024

(54) HAY BALE HUNTING BLIND

(71) Applicant: AOB Products Company, Columbia, MO (US)

(72) Inventors: Ryan Varnum, Columbia, MO (US); Timothy S. Kinney, Warrenton, MO (US); Seth Wheeler, Columbia, MO (US); James Tayon, Moberly, MO (US); Jason Nickerson, Columbia, MO (US); Kyle Smith, Columbia, MO (US); Matthew Kinamore, Columbia, MO (US); Curtis Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 36 days.

(21) Appl. No.: 17/659,262

(22) Filed: Apr. 14, 2022

(65) Prior Publication Data

US 2022/0333399 A1   Oct. 20, 2022

Related U.S. Application Data

(60) Provisional application No. 63/175,321, filed on Apr. 15, 2021.

(51) Int. Cl.
| | |
|---|---|
| *E04H 15/00* | (2006.01) |
| *A01M 31/02* | (2006.01) |
| *E04H 15/54* | (2006.01) |
| *E04H 15/58* | (2006.01) |
| *E04H 15/64* | (2006.01) |

(52) U.S. Cl.
CPC ......... *E04H 15/001* (2013.01); *A01M 31/025* (2013.01); *E04H 15/008* (2013.01); *E04H 15/54* (2013.01); *E04H 15/58* (2013.01); *E04H 15/64* (2013.01)

(58) Field of Classification Search
CPC .......................... E04H 15/001; A01M 31/025
See application file for complete search history.

(56) References Cited

U.S. PATENT DOCUMENTS

| | | | | |
|---|---|---|---|---|
| 2,168,913 | A | * | 8/1939 | Middleton .............. E04H 15/00 190/18 R |
| 3,052,251 | A | * | 9/1962 | Jean, Jr. .................. E04H 15/46 135/900 |
| 3,202,193 | A | | 8/1965 | Ware |

(Continued)

*Primary Examiner* — David R Dunn
*Assistant Examiner* — Danielle Jackson
(74) *Attorney, Agent, or Firm* — Stinson LLP

(57) ABSTRACT

A generally cylindrical hay bale hunting blind, components thereof, and associated methods. The hay bale hunting blind includes a frame and a cover connectable to the frame. The frame includes a first set of snap connectors and the cover includes a second set of snap connectors. The cover includes two end panels, a main panel, window panels, and a water fowl door panel. The end panels snap to the round ends of the cylindrical frame, forming a snap connection. The edge margins of the main panel snap at the edge margins of the end panels forming another snap connection. The frame defines a water fowl door frame in which a water fowl door is pivotably connected to the frame and pivots outward relative to the frame about a pivot axis at the bottom of the door. A water fowl door panel snaps at the periphery of the water fowl door.

20 Claims, 9 Drawing Sheets

(56) References Cited

U.S. PATENT DOCUMENTS

| | | | |
|---|---|---|---|
| 4,164,089 A * | 8/1979 | George | A01M 31/025 |
| | | | 52/2.21 |
| 4,456,272 A * | 6/1984 | Kroeger | B62B 13/00 |
| | | | 52/36.2 |
| 4,777,755 A | 10/1988 | Colburn | |
| 4,794,717 A | 1/1989 | Horsmann | |
| 4,926,893 A * | 5/1990 | Klopfenstein | E04H 15/001 |
| | | | 135/901 |
| 5,033,493 A | 7/1991 | Senchuck | |
| 5,096,217 A | 3/1992 | Hunter | |
| 5,148,646 A | 9/1992 | Lutostanski | |
| 5,226,261 A | 7/1993 | Wilbourn et al. | |
| 5,339,852 A | 8/1994 | Bull | |
| 5,343,887 A | 9/1994 | Danaher | |
| 5,377,711 A * | 1/1995 | Mueller | E04H 15/001 |
| | | | 135/901 |
| 5,414,950 A | 5/1995 | Johnson, Sr. | |
| 5,479,738 A | 1/1996 | Danna | |
| 5,758,679 A | 6/1998 | Tamburelli | |
| 5,906,217 A * | 5/1999 | Hill | E04H 15/48 |
| | | | 135/132 |
| 6,016,823 A | 1/2000 | Hill | |
| 6,170,503 B1 | 1/2001 | Lin Shy | |
| 7,178,538 B2 | 2/2007 | Ransom | |
| 8,181,661 B2 | 5/2012 | Livacich et al. | |
| 8,776,814 B1 * | 7/2014 | Beam | E04H 15/44 |
| | | | 135/117 |
| 8,881,753 B2 | 11/2014 | Rowley | |
| 9,140,031 B2 | 9/2015 | Fields | |
| 9,187,922 B1 | 11/2015 | Phillips, Jr. | |
| 9,238,924 B2 | 1/2016 | Wyant | |
| 9,273,484 B2 | 3/2016 | Rowley | |
| 9,758,985 B2 | 9/2017 | Hayes | |
| 9,890,552 B2 | 2/2018 | Schneider et al. | |
| 10,077,523 B2 | 9/2018 | Im et al. | |
| 10,492,486 B1 | 12/2019 | Hayes | |
| 11,470,840 B2 * | 10/2022 | Bell | A01M 31/025 |
| 2011/0005561 A1 | 1/2011 | Noll | |
| 2012/0216845 A1 | 8/2012 | Noll | |

* cited by examiner

HAY BALE HUNTING BLIND

CROSS-REFERENCE TO RELATED APPLICATION

The present application claims priority to U.S. Provisional Patent App. No. 63/175,321, filed Apr. 15, 2021, which is hereby incorporated by reference in its entirety.

FIELD

The present disclosure generally relates to hunting blinds, and more particularly to a hunting blind that simulates the appearance of a round or cylindrical hay bale, often seen in or near agricultural fields.

BACKGROUND

When a person is hunting, photographing, or observing wildlife, it is desirable for the person to remain hidden to reduce the chance of the wildlife detecting the person. A person may conceal themselves by using a hunting blind.

SUMMARY

In one aspect, a hay bale hunting blind for hiding a person comprises a frame configured to define a support structure. The frame includes a frame body to define an interior space sized and shaped for hiding the person in the interior. The frame includes a first set of snap connectors in a spaced arrangement with respect to each other on the frame body. A cover is configured to cover the frame. The cover is connectable to the frame to maintain a position of the cover with respect to the frame. The cover when connected to the frame bounds the interior. The cover includes a second set of snap connectors in a spaced arrangement with respect to each other and corresponding to the spaced arrangement of the first set of snap connectors of the frame. The second set of snap connectors is configured to mate with the first set of snap connectors to form snap connections. The frame and cover are configured to simulate the appearance of a generally cylindrical hay bale when the cover is connected to the frame.

In another aspect, a hay bale hunting blind for hiding a person comprises a frame configured to define a support structure. The frame includes a frame body configured to define an interior space sized and shaped for hiding the person in the interior. The frame body defines a water fowl door opening. The frame comprises a water fowl door connected to the frame body by a pivot connection located adjacent a bottom of the water fowl door. The pivot connection allows the water fowl door to pivot between a closed position and an open position. The water fowl door in the closed position covers the water fowl door opening. The water fowl door in the open position is pivoted outward away from the interior to uncover the water fowl opening. A cover is configured to cover the frame body to bound the interior of the blind. The frame and cover are configured to simulate an appearance of a generally cylindrical hay bale when the cover is on the frame.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
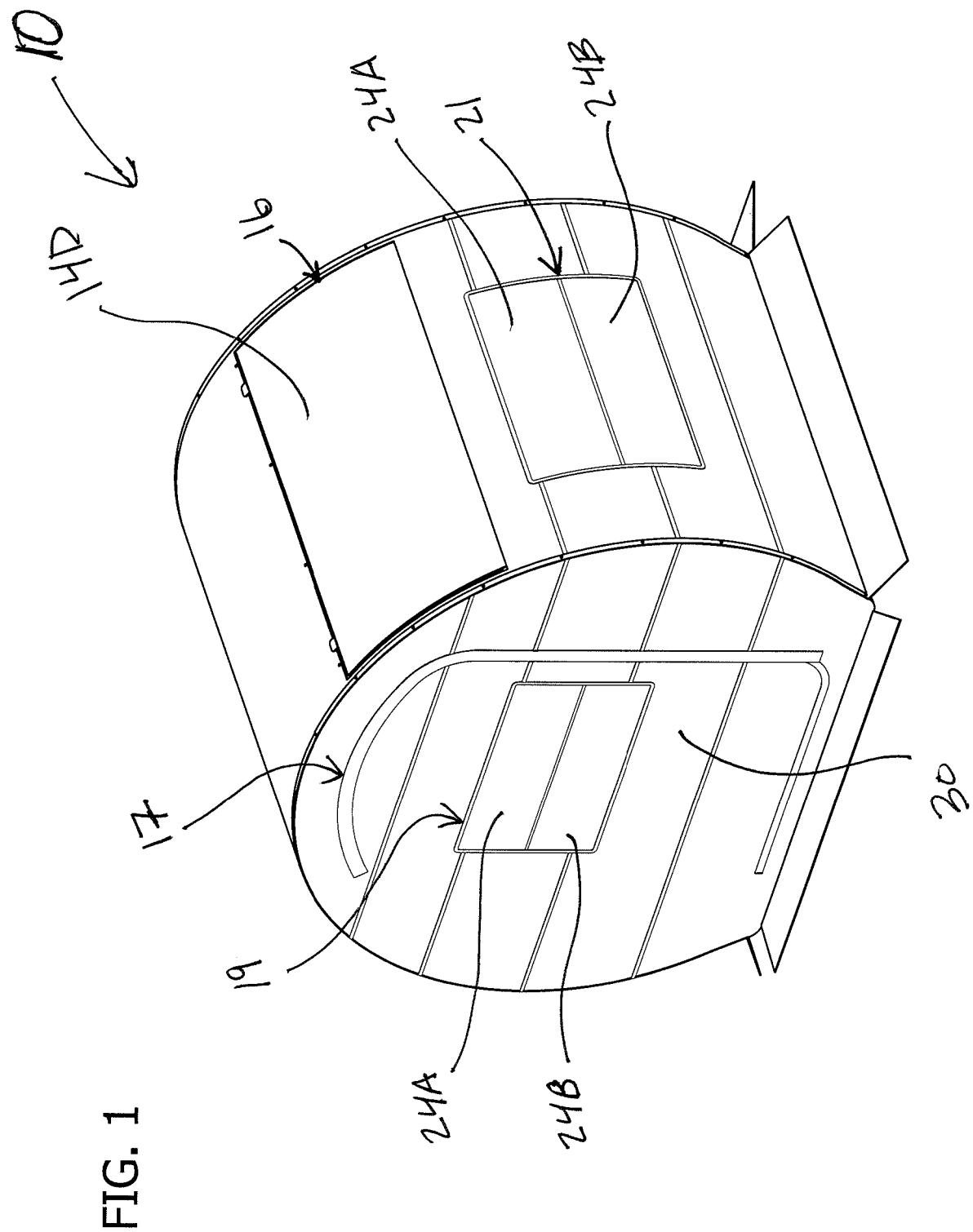
FIG. 1 is a front perspective of a hay bale hunting blind with windows, a main door, and a water fowl door in closed positions.

A hay bale hunting blind of the present disclosure is indicated by 10. In one embodiment, the hay bale hunting blind simulates the appearance of a large round hay bale having a generally cylindrical shape.

The hay bale hunting blind 10 includes a frame 12 and a cover 14 connected to the frame. The hunting blind may be used for hiding or concealing a hunter (broadly, "person"). The blind 10 includes a water fowl door 16 that can be pivoted outward to an open position and inward to a closed position. The blind 10 also includes a human access door 17, a window 19 in the human access door, and a window 21 in a front of the blind. Other configurations of windows and/or doors can be used. The hay bale hunting blind is assembled to rest on the ground, but it may rest on a trailer bed (platform) or some other structure.

The frame 12 comprises frame components (broadly, "framing") that together make up a frame body that provides structure to the hay bale hunting blind. In the illustrated embodiment, the frame components include first (left) and second (right) (substantially identical) end rings 12A, 12B; a water fowl door body 16A (described below), vertical supports 18; crossbars 20, and straps 22. The frame body includes snap connectors that will be explained in greater detail below. The frame components may be made of structural steel, or other metal (e.g. metal tubing, square tubing, angle, bar, plate, etc.). The frame body defines an interior space sized and shaped for a hunter or hunters to comfortably sit and/or stand. In the illustrated embodiment, the hay bale hunting blind 10 has a length L of about eight feet, a width W of about seven feet, a ground width GW of about six feet, and a height H of about six feet. Other configurations and dimensions can be used without departing from the scope of this disclosure.

The cover 14 comprises cover components (broadly, "panels") that cover parts of the frame body to conceal the hunter. In the illustrated embodiment, the cover components include first (left) and second (right) (substantially identical) end panels 14A, 14B; a third (main) panel 14C; a water fowl door panel 14D; and window panels 24. The cover panels each have an inner (interior) face and an outer (exterior) face. The cover panels include snap connectors spaced about edge margins of the covers for connecting to the snap connectors of the frame body or to snap connectors of other panels, as will be explained in further detail below. The cover 14 is made of a flexible material (e.g. fabric or canvas), which is desirably water-resistant or water proof, and more desirably a color that resembles the color of hay or straw, (e.g. tan, khaki, brown, etc.). In an unassembled state, the main panel 14C, is generally rectangular and/or generally cylindrical for fitting over the mid portion of the frame body. The end panels are generally circular for fitting over the end rings. Other configurations can be used without departing from the scope of this disclosure.

Referring now to the snap connectors of the frame and the cover, it will be understood that the combination of the male and female snap connectors is provided by way of example and not intended to be limiting. In other words, when referring to male and female snap connectors in the embodiments below, it is understood that one of ordinary skill in the art could simply swap some or all of the male connectors for female connectors, or vice versa.

The snap connectors of the frame are provided at generally equal intervals around the entirety of the frame. It will become apparent that the spacing of the snap connectors on the cover correspond to the spacing of the connectors on the frame.

Figure 5:
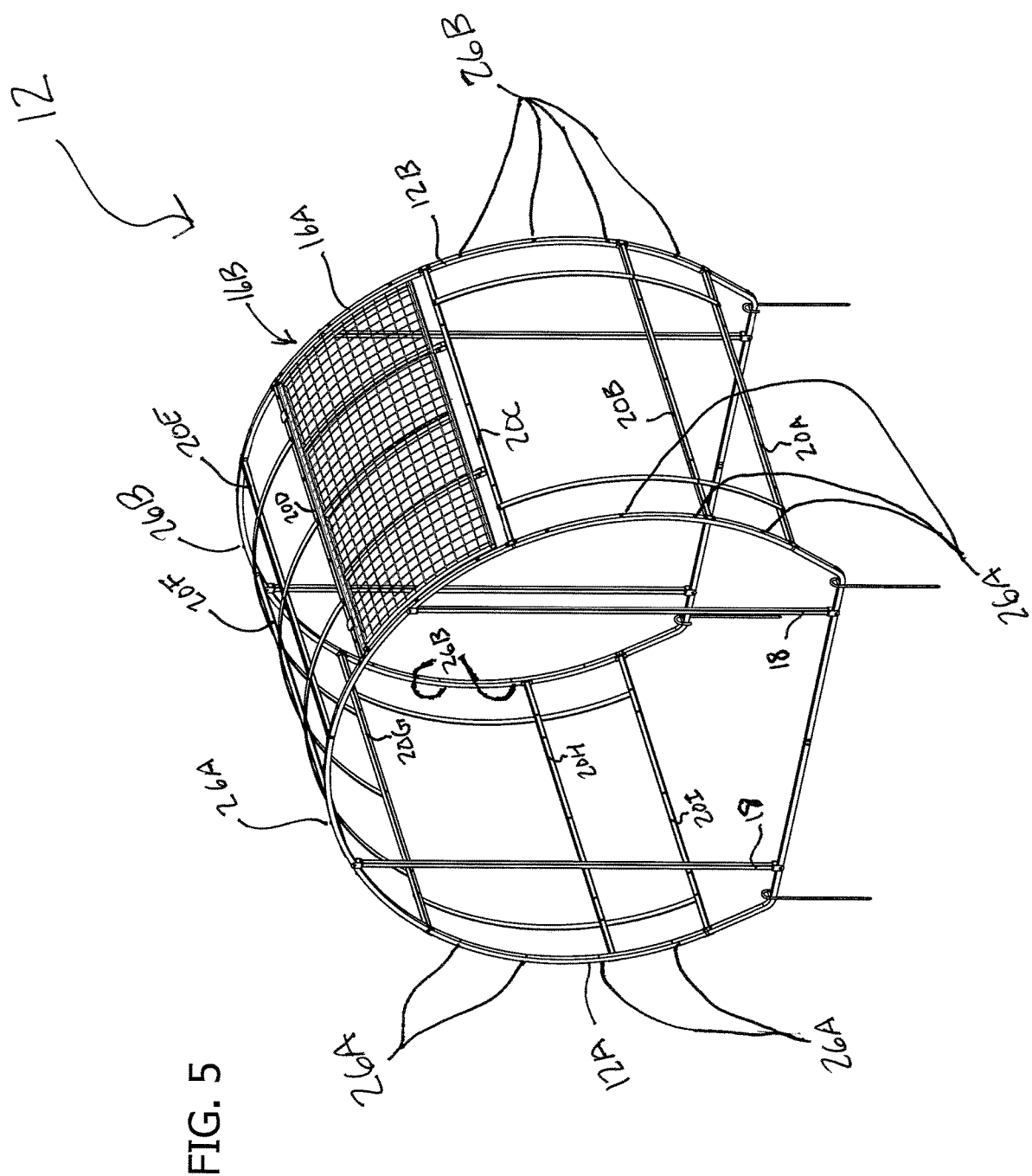
FIG. 5 is a front left perspective of a frame body and a water fowl door body in a closed position.

Referring now more specifically to the snap connectors of the frame, as shown in FIG. 5. The frame body includes first (left) and second (right) sets of snap connectors, 26A and 26B, connected to the left and right end rings in a spaced arrangement. In the illustrated embodiment, the first and second sets of snap connectors include male snap connectors. The snap connectors are fastened to the frame body using fasteners (e.g. using screws or rivets). The end panels 14A, 14B are generally circular in shape and configured to cover the area of the end rings. The end panels 14A, 14B define entry and egress doors 17. The left end panel 14A includes third (female) and fifth (male) sets of snap connectors 26C and 26E, located at the edge margin of the left panel. The third (female) set 26C is in a spaced arrangement on the inner edge margin to correspond to the first (male) set 26A of snap connectors of the left end ring 12A. The fifth (male) set 26E is located on the exterior edge margin in a spaced arrangement. The spacing is such that the snaps of the fifth set 26E are spaced between the snaps of the interior third set 26C. However, other locations are of course possible.

It is understood that the right end panel 14B is substantially identical to the left end panel, as described above. The right end panel 14B includes fourth (female) and sixth (male) sets of snap connectors located at the edge margin of the right panel. The fourth (female) set is in a spaced arrangement on the inner edge margin to correspond to the second (male) set 26B of snap connectors of the right end ring 12B. The sixth (male) set is located on the exterior edge margin in a spaced arrangement. The spacing is such that the snap connectors of the exterior sixth set are spaced between the snaps of the interior fourth set. However, other locations are of course possible.

The main panel 14C is generally rectangular and sized and shaped to span across the length of the frame body to bound an interior of the hay bale hunting blind. The main panel defines an opening for the water fowl door 16, and openings for windows, as will be described in further detail below. The main panel 14C includes a seventh 26G (female) and eighth 26H (female) sets of snap connectors. Both the seventh and eighth sets are located on the interior face of the main panel 14C. The seventh (female) set 26G is spaced about the left edge margin of the main panel 14C in a spaced arrangement to correspond with the fifth (male) set of the left end panel 14A. Similarly, the eighth (female) set 26H is spaced about the right edge margin of the main panel 14C in a spaced arrangement to correspond with the sixth (male) set of the right end panel 14B.

Desirably, a tight fit is formed when the left end panel is snapped to the left end ring; when the right end panel is snapped to the right end ring; and when the left and right edge margins of the main panel are snapped to the of left and right end panels.

Figure 6:
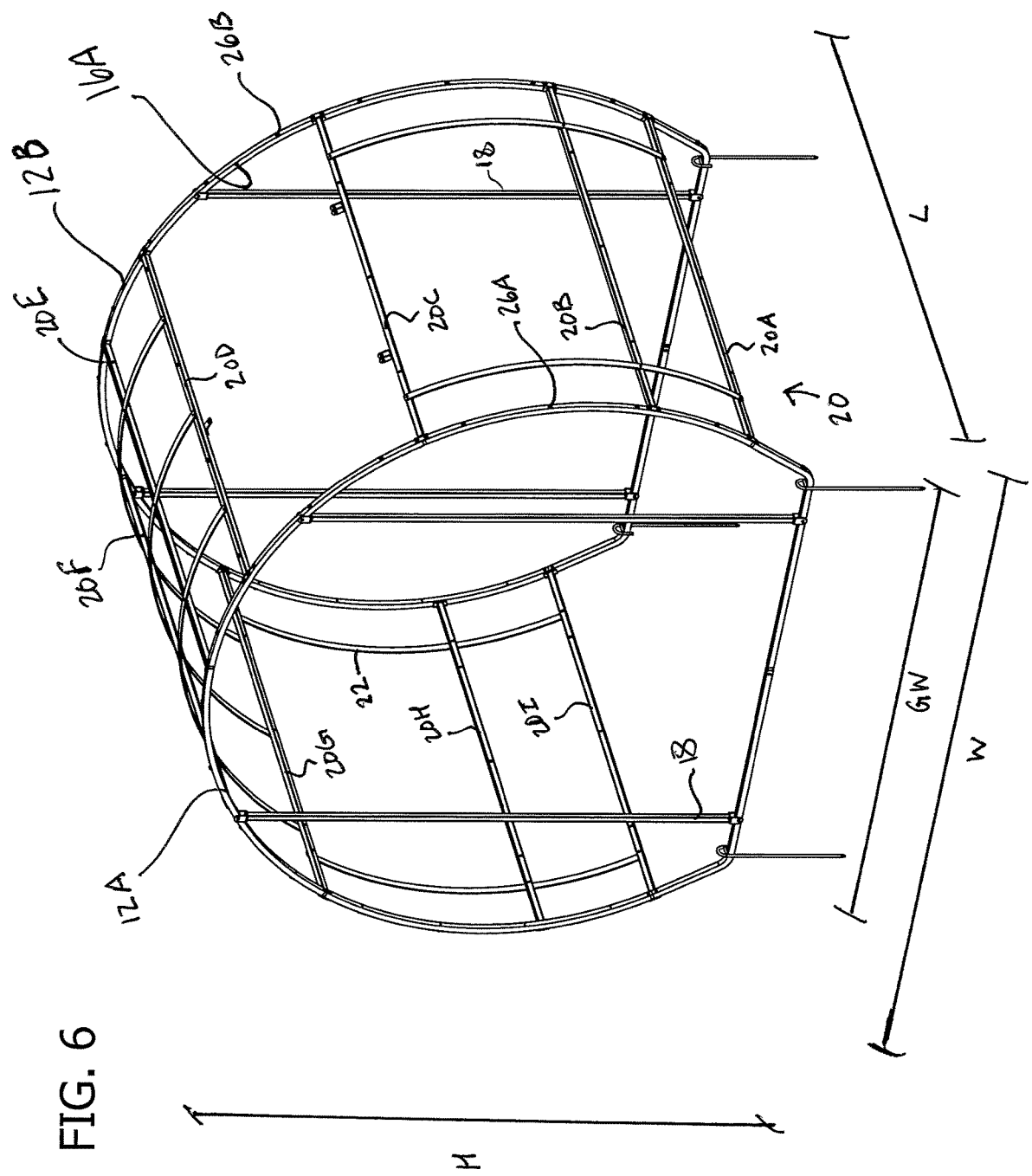
FIG. 6 is a front left perspective of the frame body defining the water fowl door opening.

The frame body defines a water fowl door frame 16A. As shown in FIG. 6, the frame body includes a plurality of crossbars spaced laterally between the end rings. In the illustrated embodiment, there are nine crossbars, 20A-20I. The water fowl door frame 16A is defined by two crossbars 20C and 20D, and portions of the end rings between the crossbars 20C and 20D. In the illustrated embodiment, there is one water fowl door frame spanning the length of the crossbars at the front side of the hay bale blind. In other embodiments, there may be water fowl door frames on opposite sides of the hay bale blind; or there may be more (e.g. two or three) individual door frames. Water fowl door frames having different shapes (e.g. square, circle, etc.) are possible.

Figure 7:
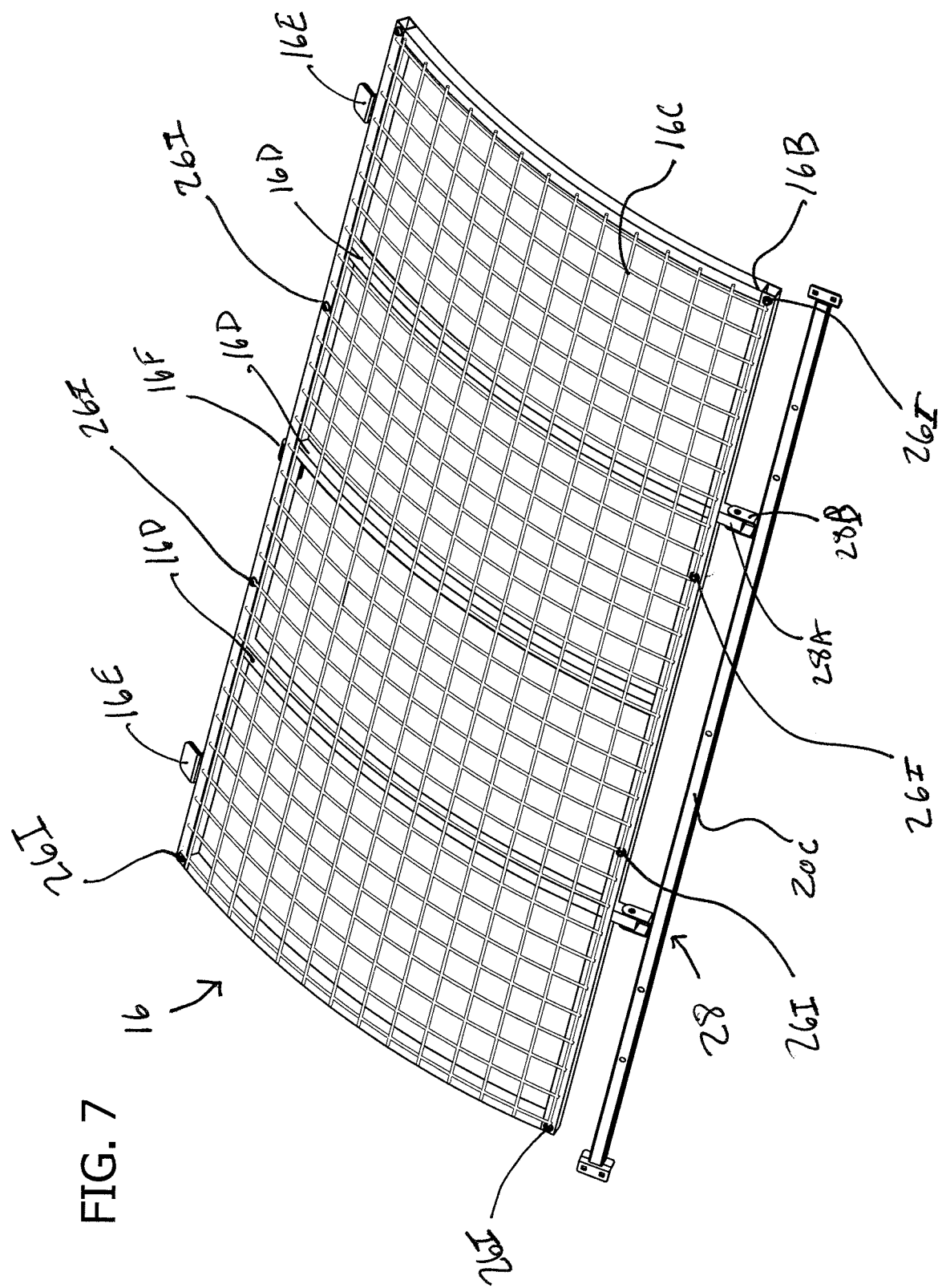
FIG. 7 is a perspective of the water fowl door body decoupled from the frame body.

As shown in FIG. 5, the water fowl door 16 is sized and shaped to connect to the water fowl door frame 16A. The water fowl door 16 includes a water fowl door body 16B, water fowl door support structure 16C, and ribs 16D. Referring to FIG. 7, the water fowl door body 16B is generally rectangular and includes lower and upper sides and left and right sides. The left and right sides of the water fowl door body are generally convex having a radius that is about equal to the radius of the end rings of the frame. However, flat sides (i.e. sides having no radius) are possible. The water fowl door body includes a ninth (male) set 26I of snap connectors in a spaced arrangement about the water fowl door body.

Figure 8:
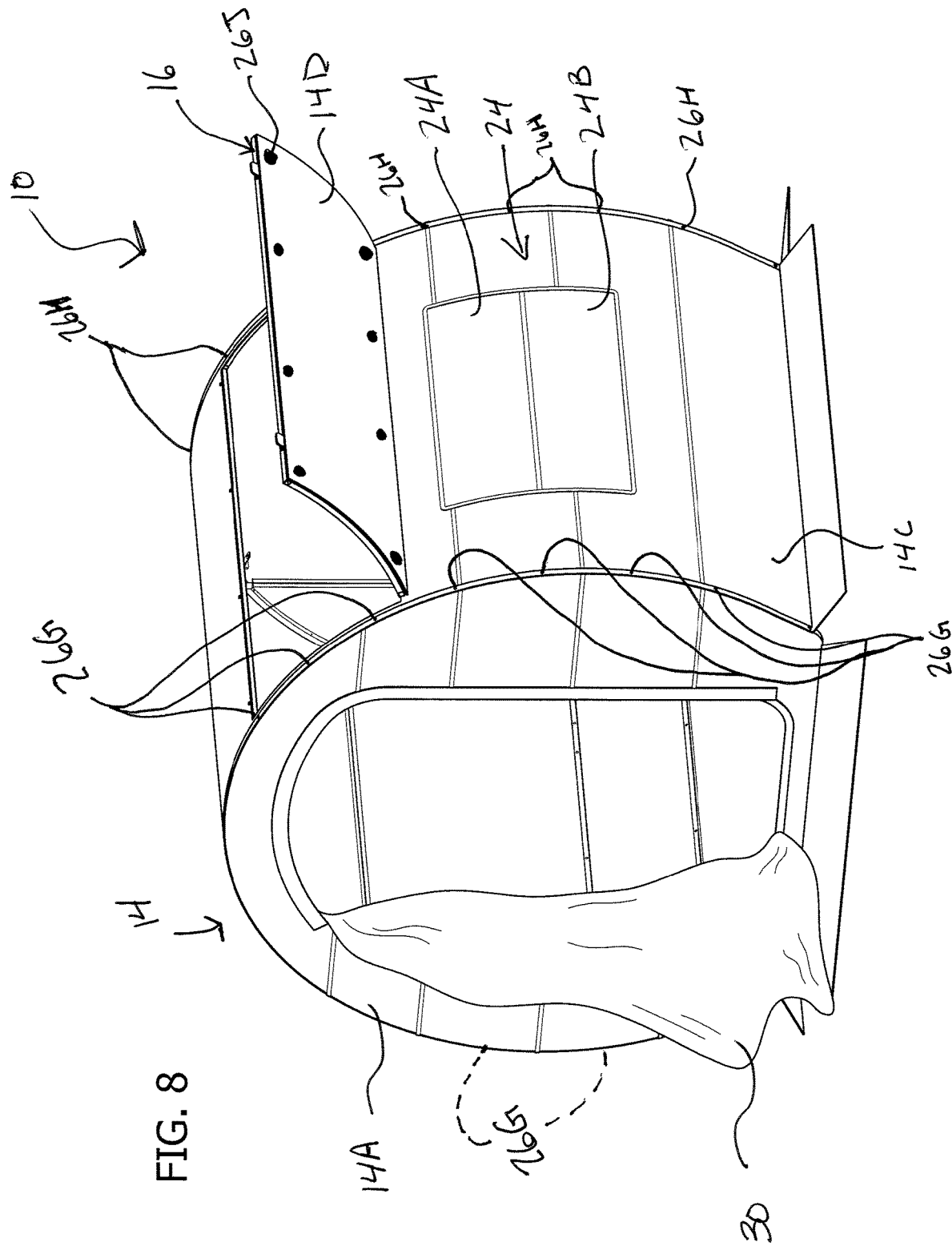
FIG. 8 is a perspective of the hay bale hunting blind with main door and water fowl door in open positions.
Figure 9:
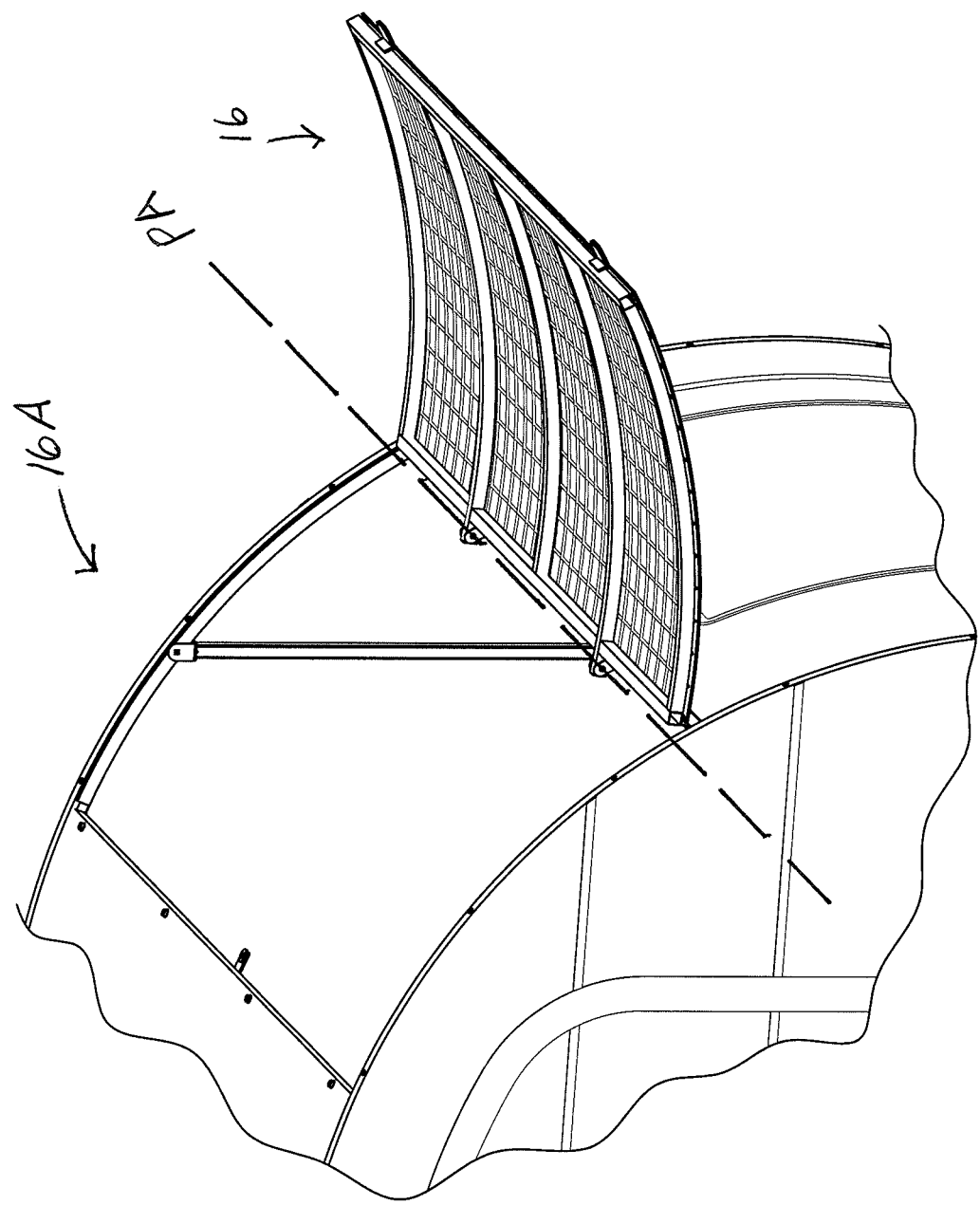
FIG. 9 is a perspective of the water fowl door in the open position.

In the illustrated embodiment, the water fowl door 16 is pivotable about a pivot axis PA defined by a pivot connection 28 (FIGS. 7, 9). The pivot connection 28 includes a hinge knuckle 28A, stemming from the water fowl door body and a hinge knuckle connector 28B stemming from the crossbar. The hinge knuckle 28A is pivotably connected to the hinge knuckle connector 28B by a fastener (e.g. pin, screw, etc.). The location of the pivot axis PA allows the water fowl door 16 to pivot outward/downward to an open position (e.g., FIGS. 8 and 9) and inward/upward to a closed position (e.g., FIGS. 1 and 2). Stops 16E extend from the upper part of the door to stop of the door from swinging through the door frame when in the closed positon. A latch 16F, is connected to the upper part of the door frame so the hunter on the interior can selectively latch and unlatch the water fowl door. When the water fowl door is swung open it pivots about the pivot axis PA and comes to a stop when the lower part of the water fowl door abuts the lower part of the water fowl door frame. In the illustrated embodiment in FIG. 9, the water fowl door may pivot to an angle of about 145 degrees with respect to the door frame. However, pivoting between 145 and 180 degrees, or other ranges of pivoting, with respect to the door frame is possible.

The cover 14 includes a water fowl door panel 14D that is sized and shaped to connect to the water fowl door body. The water fowl door panel 14D includes a tenth (female) set of snap connectors 26J spaced around an interior edge margin of the panel in a spaced arrangement to correspond to the ninth (male) set of snap connectors 26I of the water fowl door body. The water fowl door panel 14D includes edge margins at the periphery that overlap a portion of the main panel 14C that surrounds the water fowl door frame. It will be appreciated that the water fowl door panel 14D remains connected to the water fowl door body 16B throughout openings and closing.

Crossbars can be used to define openings for front and or rear windows of the hay bale hunting blind. In the embodiment shown in FIGS. 5 and 6, a front window frame is defined by crossbars 20B and 20C, and a rear window frame is defined by crossbars 20G and 20H.

Figure 2:
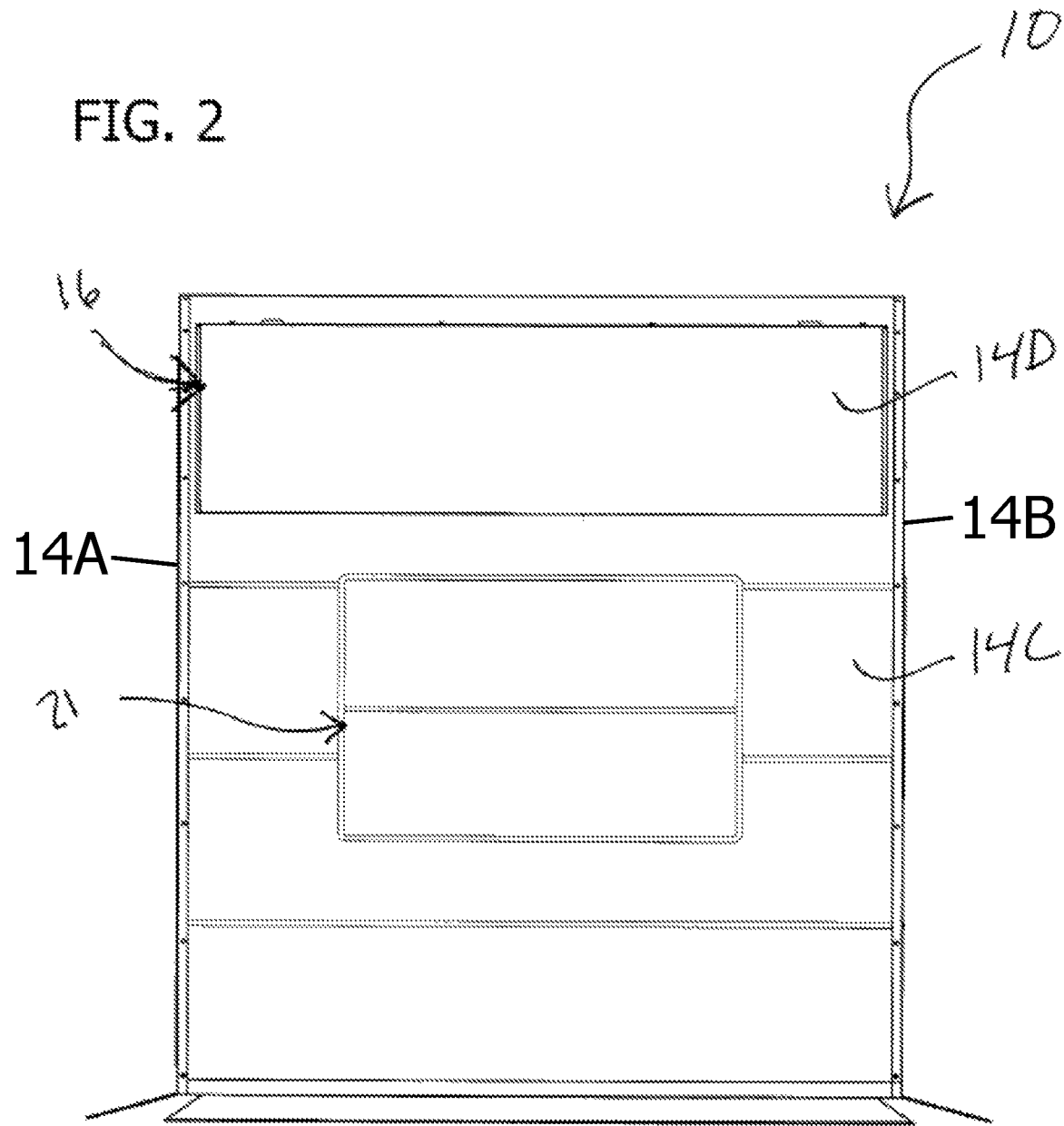
FIG. 2 is a front elevation of the hay bale hunting blind with window and water fowl door in closed positions.

In the embodiment shown in FIGS. 1, 2, and 8, an upper panel and a lower panel 24A, 24B slidably connect to the interior of the main panel 14C. The window panels 24A, 24B can be slid together to closed positions (closed configuration) or slid apart to open positions (open configuration). In the embodiment shown, there is an upper panel and a lower panel. Only a front window is shown in the drawings but it is understood a rear window is possible.

Figure 3:
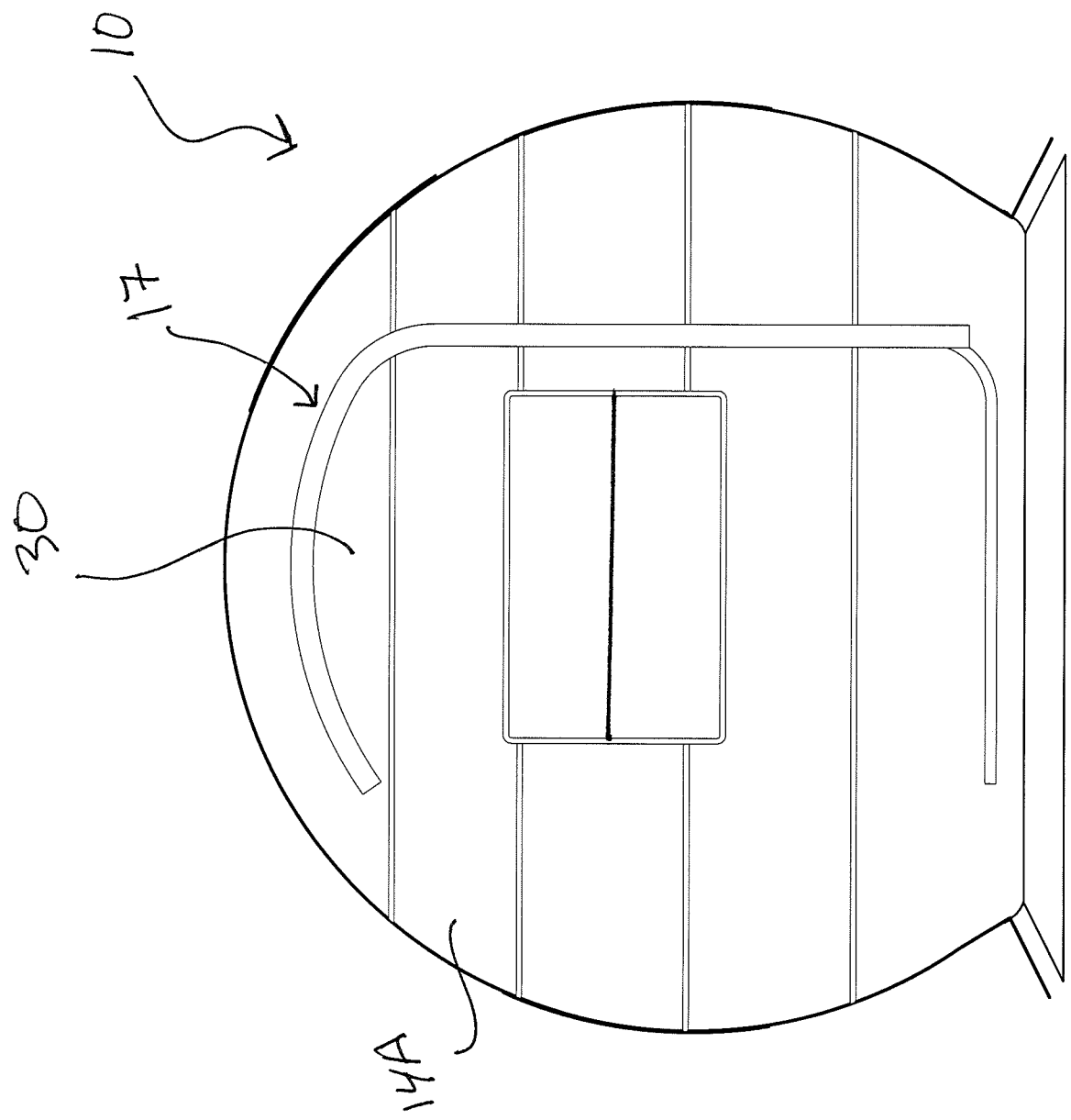
FIG. 3 is a left elevation with the main door and window in closed positions.
Figure 4:
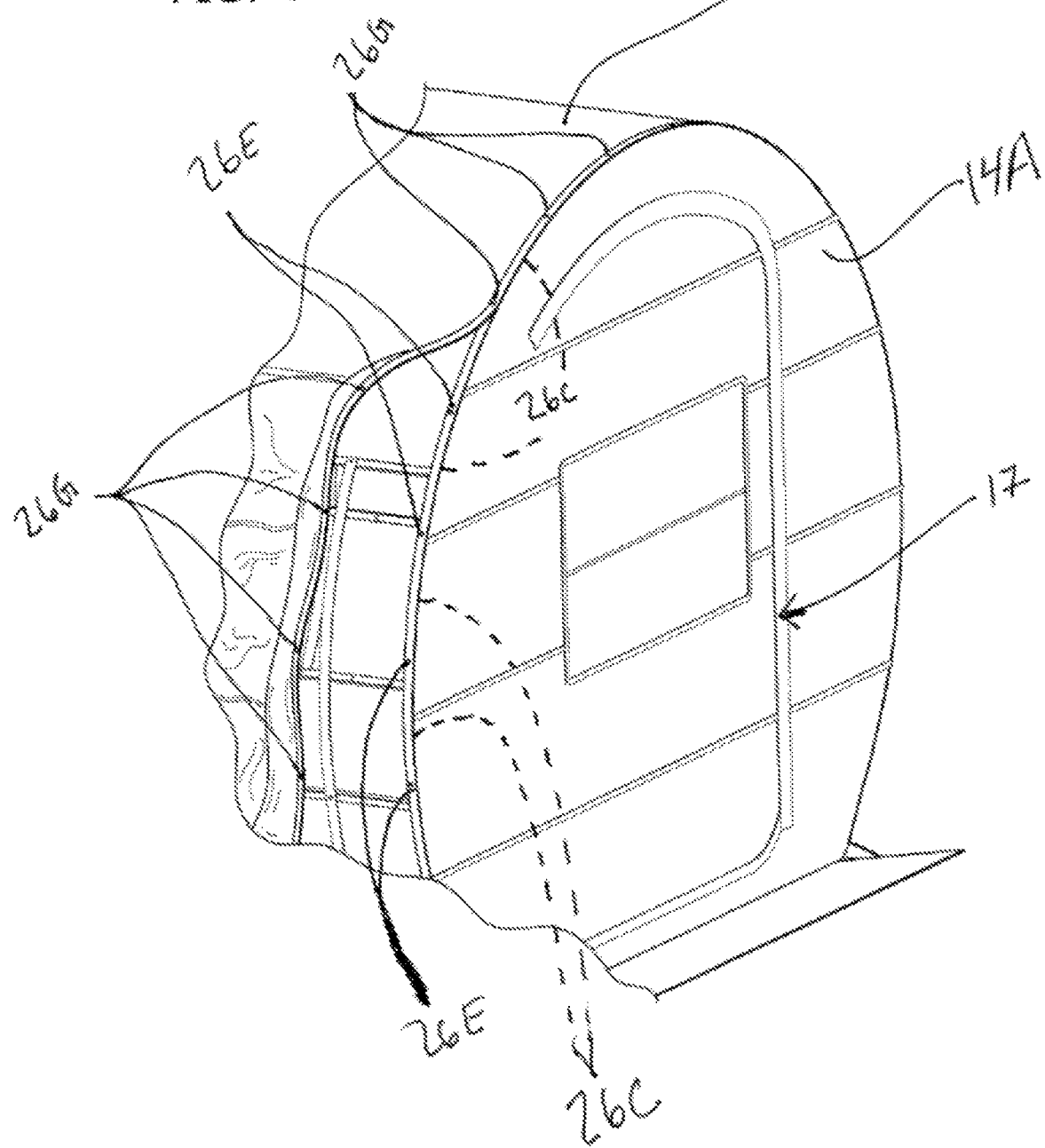
FIG. 4 is a rear left perspective of an end panel snapped to a frame and a main panel partially snapped to the end panel.

The vertical uprights 18 of the frame body define an entry and egress door frame. The end panels 14A, 14B include a door flap 30 that can be opened and closed using a zipper. In the embodiment shown in FIGS. 1 and 3, the door further defines slidable window panels 24A, 24B. The windows and doors can be fastened to a closed position using fasteners (e.g. buttons, magnets, Velcro®, etc.).

For purposes of this disclosure, the side of the hay bale blind with the water fowl door 16 is the front side. Left, right, up, down, front, rear, upward, and downward as referenced herein are in relation to the front side. It is understood, that such indicators are not intended to be construed as limiting. Likewise, it is also to be understood that first, second, third, etc. indicators in reference to the set of snap connectors and panels are not intended to be construed as limiting.

In a method of assembling the blind 10, the frame 12 is constructed, and then the cover 14 is installed on the frame. For example, the end panels 14A, 14B are connected to the frame 12 by the respective snap connections, then the main panel 14C is connected to the end panels via the respective snap connections and thus connected to the frame. In the illustrated embodiment, the peripheral edge margins of the main panel 14C overly the exterior surfaces of the edge margins of the end panels 14A, 14B. In other embodiments, the peripheral edge margins of the main panel may overly interior surfaces of the end panels and/or the main panel could be directly connected to the frame rather than indirectly via the end panels. Moreover, the main panels, end panels, and water fowl panels could each comprise multiple panel portions connected together to form the respective panel. Other configurations can be used without departing from the scope of the present disclosure.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A hay bale hunting blind for hiding a person, the hay bale hunting blind comprising:
   a frame configured to define a support structure, the frame including a frame body configured to define an interior space sized and shaped for hiding the person in the interior space, the frame body defining a water fowl opening, the frame comprising a water fowl door connected to the frame body by a pivot connection located adjacent a bottom of the water fowl door, the pivot connection allowing the water fowl door to pivot between a closed position and an open position, the water fowl door in the closed position covering the water fowl opening, and the water fowl door in the open position being pivoted outward away from the interior space to uncover the water fowl opening;
   a cover configured to cover the frame to bound the interior space of the blind;
   wherein the frame and cover are configured to simulate an appearance of a generally cylindrical hay bale when the cover is on the frame.

2. A hay bale hunting blind of claim 1, wherein the water fowl door includes a water fowl door body, the water fowl door comprising a first set of snap connectors in a spaced arrangement with respect to each other on the water fowl door body.

3. A hay bale hunting blind of claim 2, wherein the cover includes a waterfowl door panel including a set of snap connectors in a spaced arrangement with respect to each other corresponding to the spaced arrangement of a first set of snap connectors of the water fowl door body for covering the water fowl door body, the first set of snap connectors configured to mate with the second set of snap connectors to form snap connections.

4. A hay bale hunting blind of claim 3, wherein a peripheral edge margin of the of the waterfowl door panel is configured to overlie exterior edge margins of the water fowl door body when the water fowl door is in the closed position.

5. A hay bale hunting blind of claim 1, wherein the cover comprises generally round end walls and a main panel extending between the end panels.

6. The hay bale hunting blind of claim 1, wherein the cover includes a water fowl door panel covering and moveable with the water fowl door of the frame.

7. The hay bale hunting blind of claim 6, wherein the water fowl door includes a water fowl door body, the water fowl door panel of the cover being mounted on the water fowl door body.

8. The hay bale hunting blind of claim 7, wherein the water fowl door panel includes a first set of snap connectors and the water fowl door body includes a second set of snap connectors, the first and second sets of snap connectors configured to mate with one another to mount the water fowl door panel to the water fowl door body.

9. The hay bale hunting blind of claim 7, wherein the cover comprises generally round end walls and a main panel extending between the end walls.

10. The hay bale hunting blind of claim 9, wherein the water fowl door panel is angularly spaced apart from the main panel about the pivot connection when the water fowl door is in the open position.

11. The hay bale hunting blind of claim 9, wherein the water fowl door panel is free of direct connection to the main panel of the cover.

12. The hay bale hunting blind of claim 1, wherein the water fowl door extends generally radially outward from the generally cylindrical hay bale when the water fowl door is in the open position.

13. The hay bale hunting blind of claim 1, wherein water fowl door is in a cantilevered arrangement when the water fowl door is in the open position.

14. The hay bale hunting blind of claim 1, wherein the frame is arranged to engage the water fowl door to set and hold the water fowl door in the open position.

15. The hay bale hunting blind of claim 14, wherein the frame is arranged to engage a lower part of the water fowl door to set and hold the water fowl door in the open position.

16. The hay bale hunting blind of claim 1, wherein the water fowl door pivots downward toward the open position.

17. The hay bale hunting blind of claim 1, wherein the water fowl door pivots about 145-degrees between the open and closed positions.

18. The hay bale hunting blind of claim 1, wherein the water fowl door pivots in a range of 145 degrees to 180 degrees between the open and closed positions.

19. The hay bale hunting blind of claim 1, wherein the water fowl door includes a rigid water fowl door body.

20. The hay bale hunting blind of claim 1, wherein the water fowl door is directly connected to the frame body by the pivot connection.

\* \* \* \* \*